United States Patent [19]

Klein

[11] Patent Number: 4,894,071
[45] Date of Patent: Jan. 16, 1990

[54] PORTABLE AIR CLEANER

[75] Inventor: Max Klein, Shrewsbury, N.J.

[73] Assignee: Tech Paper, Inc., Pittsfield, Mass.

[21] Appl. No.: 249,855

[22] Filed: Sep. 27, 1988

[51] Int. Cl.⁴ .............................................. B01D 46/00
[52] U.S. Cl. ............................................ 55/97; 55/274; 55/351; 55/354; 55/356; 55/213
[58] Field of Search ................ 55/351, 354, 97, 356, 55/274, 213

[56] References Cited

U.S. PATENT DOCUMENTS

| | | | |
|---|---|---|---|
| 1,270,613 | 6/1918 | Gustavson | 55/354 |
| 2,722,993 | 11/1955 | Gerber et al. | 183/37 |
| 2,763,139 | 9/1956 | Callan et al. | 55/354 |
| 2,875,680 | 3/1959 | Forshee | 98/115 |
| 3,013,630 | 12/1961 | Palmore | 183/62 |
| 3,216,183 | 11/1965 | Larsson | 55/478 |
| 3,350,854 | 11/1967 | Revell | 55/354 |
| 3,552,099 | 4/1968 | Floyd | 55/354 |
| 3,616,620 | 11/1971 | Neumann | 55/354 |
| 3,710,588 | 1/1973 | Martinez | 62/317 |
| 4,174,205 | 11/1979 | Koushiafes | 55/354 |
| 4,239,516 | 12/1980 | Klein | 55/389 |
| 4,293,378 | 10/1981 | Klein | 162/145 |
| 4,627,863 | 12/1985 | Klein | 55/354 |

FOREIGN PATENT DOCUMENTS 278322 12/1986 Japan ....................................... 55/354

Primary Examiner—Bernard Nozick
Attorney, Agent, or Firm—Dann, Dorfman, Herrell and Skillman

[57] ABSTRACT

A portable air cleaner consisting of an upright housing having casters on the bottom to enable it to be moved readily into different locations. The housing has a compartment for containing a roll of filter medium, preferably a filtration paper as disclosed in U.S. Pat. Nos. 4,239,516 and 4,293,378, which may be drawn from the roll compartment across the hollow frame.

In use, a fresh section of the filter paper is positioned overlying the frame until it becomes loaded with particles filtered from the airstream flowing through the hollow frame. When the filter medium becomes loaded, a fresh section of the medium is drawn across the frame.

An overload device is provided to interrupt energization of the motor driving the fan when the filter medium becomes sufficiently loaded to block flow of air through the filter medium.

18 Claims, 2 Drawing Sheets

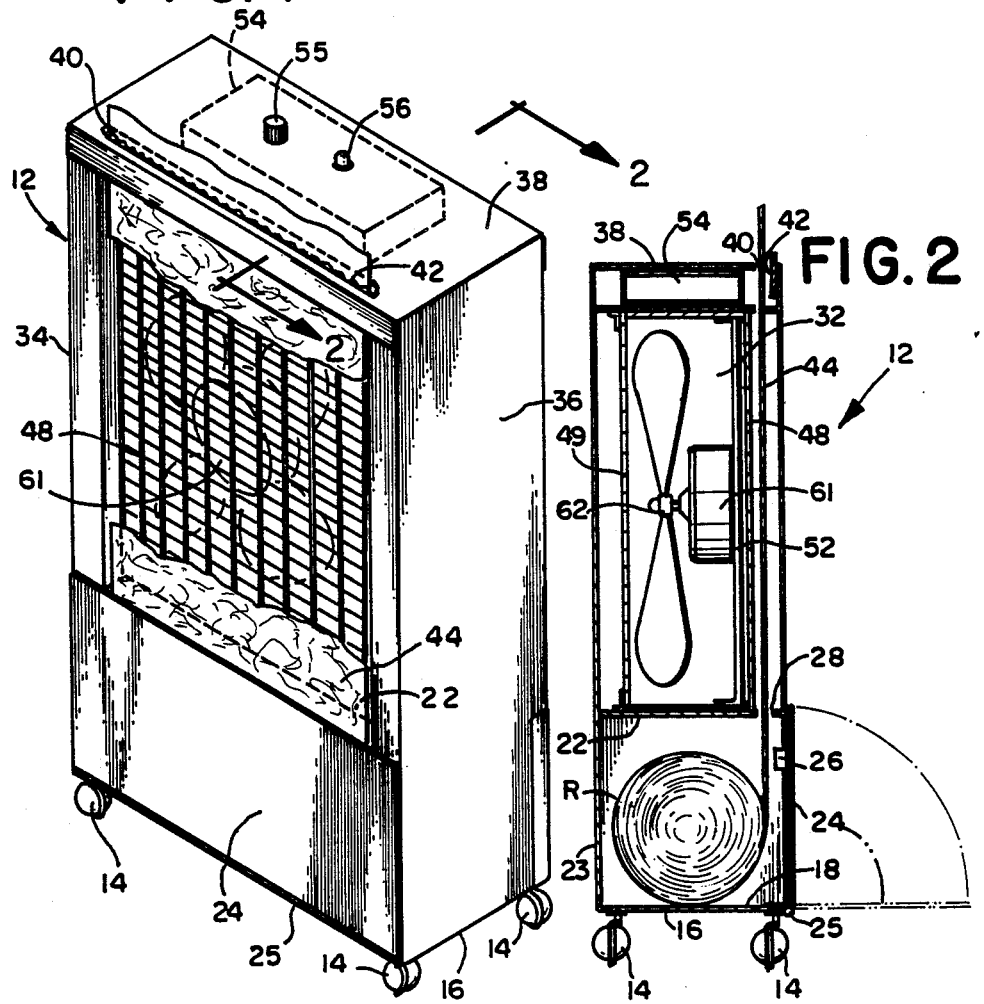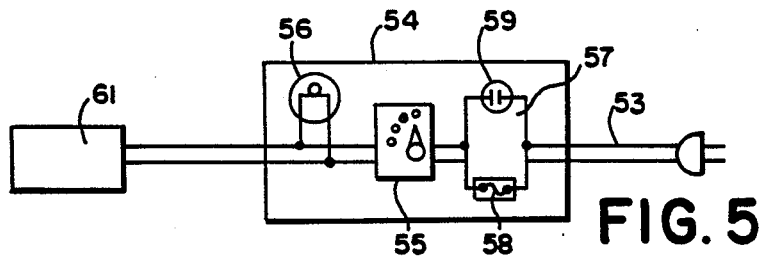

PORTABLE AIR CLEANER

FIELD OF THE INVENTION

The present invention relates to a filter for removing particulate and other foreign matter from airstreams, and is particularly directed to a portable apparatus which may be moved from location to location and is effective to draw air through the apparatus so as to reduce the particulate or other foreign matter entrained in the airstream.

BACKGROUND OF THE INVENTION

My earlier U.S. Pat. No. 4,627,863 is directed to an industrial filtration apparatus for use in factory installations to reduce the concentration of particulate matter and other foreign materials in the airstream entering the ventilating system of the plant. This system is particularly effective for use in plants which recirculate the ventilating medium through a central ventilating system.

In many workshops, both in the home and in industrial installations, the workshop is not connected to a central ventilating system and the air in the shop is subject to the buildup of entrained particulate matter generated by the operations conducted in the workshop. For example, in a woodworking shop the operation of power tools and equipment generates a substantial quantity of sawdust which may be entrained in the air and provide a generally unhealthy concentration of sawdust. Exhaust fans are effective to remove the contaminated air, but generally the volume of air handled by exhaust fans is not sufficient to maintain a reasonably clean atmosphere within the workshop. Furthermore, the exhaust fans may become fouled with the particulate matter which is deposited on the mechanism as the air passes through it.

While it is possible to provide an air-handling system for the workshop which will enable the filtration and recirculation of the ambient air in the workshop, such systems are expensive and are not economical, particularly when the workshop is used only sporadically.

Furthermore, the equipment which generates the pollution in the air may be located in different areas of the workshop, and may be operated at different times. Accordingly, the need for the air-cleaning device is not continuous and it would be desirable to provide a unit which may be moved to the vicinity of the apparatus which is causing the air pollution.

SUMMARY OF THE PRESENT INVENTION

With the foregoing in mind, the present invention provides a simple and effective means for cleaning the air in a workshop which is portable so that it may be located adjacent the apparatus which generates the air pollution and is effective to diminish the pollution in the ambient air of the workshop or other occupied area.

More particularly, the present invention provides a portable housing having a compartment for filter media in sheet form adjacent a hollow framework in which a fan is mounted to recirculate a substantial quantity of air, and means to position the filter media in the path of the air being recirculated through the frame by the fan so as to entrap any particulate or other foreign matter which may be entrained in the air of the workshop or other occupied space.

The invention provides means for readily replacing the filter media in the frame when it becomes clogged and impairs the circulation of air through the frame.

The invention provides an arrangement which permits removal and replacement of the dirty filter media without the need for tools or other special equipment.

A further object of the invention is to provide a portable air cleaner having a self-contained supply of filter media which is readily replaced when it becomes exhausted.

BRIEF DESCRIPTION OF THE DRAWINGS

All of the objects of the invention are more fully set forth hereinafter with reference to the accompanying drawing, wherein:

FIG. 1 is a perspective view of the air cleaner as seen from the front showing the filter media in broken lines;

FIG. 2 is a sectional view taken on the line 2—2 of FIG. 1;

FIG. 5 is a schematic view of the energization circuit for the motor.

DESCRIPTION OF A PREFERRED EMBODIMENT

Figure 3:
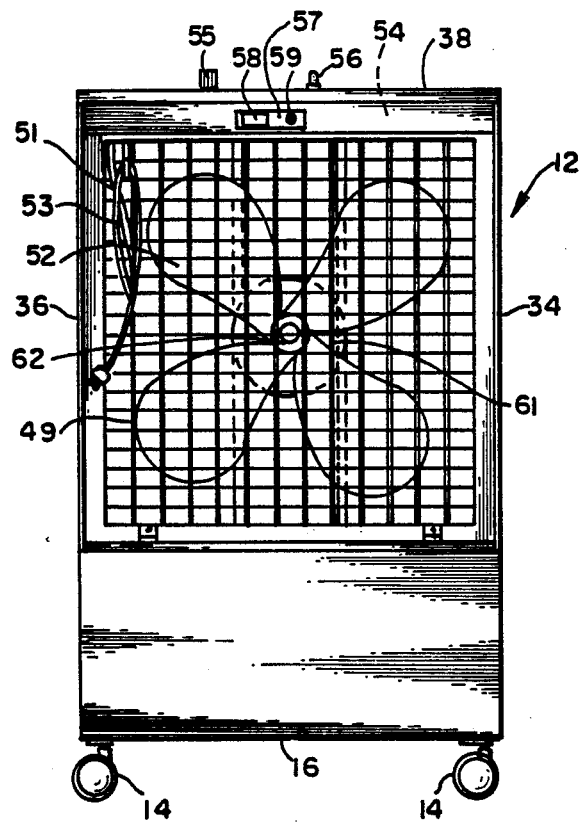
FIG. 3 is a rear view of the unit.
Figure 4:
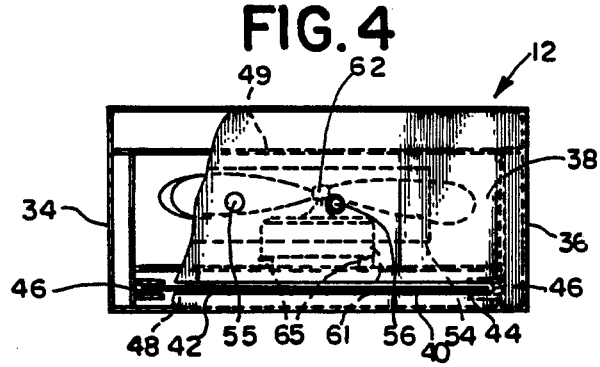
FIG. 4 is a top plan view of the unit with portions broken away to show the interior construction.

With reference to FIG. 1, the air cleaner of the illustrated embodiment of the present invention comprises an upright housing 12 which is supported on casters 14 positioned at the four corners of the bottom wall 16 of the housing. The casters permit the housing to be freely moved from place to place along the floor or any other support surface. Preferably, the housing is moved to a location close to the equipment or material which generates pollution in the workshop or other space whose air is to be cleaned. For example, in a woodworking shop, the unit may be located adjacent the lathe or sanding machine which generates a large quantity of sawdust, even when the apparatus has its own sawdust-entrapment equipment. It is well known that such equipment does not entrap all of the sawdust generated, and the remaining sawdust is entrained in the ambient air surrounding the machine, and eventually deposits in nooks and crannies of the workshop. In an artist's studio, the air cleaner may be positioned adjacent a work area where the artist uses fixatives, or other liquid sprays which tend to pollute the ambient air. The invention has also been found useful in reducing the tobacco smoke pollution generated in smoking areas within an occupied space.

The air cleaner does not need to be connected to a ventilation system, as such, but may be freestanding within the workspace. Preferably, the air cleaner is designed to cause a circulation of between 2500 and 3000 cubic feet per minutes through the frame, and in a normal workspace of 1000 square feet, the unit is effective to maintain the ambient air within the space relatively free of pollutants.

The housing 12 is divided into lower and upper parts by a transverse partition wall 22. In the lower part of the housing 12, a storage compartment 18 is defined by the transverse partition 22, a rear wall 23 and a front door 24 overlying the bottom wall 16. Preferably, the front door 24 is hinged to the bottom wall 16 at 25 so that it may open downwardly to provide a ramp for guiding a roll R of filter medium in sheet form into the compartment. In the present instance, the door 24 is a flat sheet of ferromagnetic metal hinged at the bottom and cooperable with magnetic latches 26 mounted adjacent the top wall 22. As shown in FIG. 2, the roll R of filter media is positioned in the compartment 18 resting on the bottom wall 16, and the free end of the sheet of filter media from the roll is fed forwardly from the bottom surface of the roll upwardly between the door 24 and the forward edge of the partition 22 which is foreshortened at the forward edge to provide an entrance slot 28 which permits the sheet of filter media to enter a hollow frame portion 32 positioned above the compartment 18.

The hollow frame at the top of the housing 12 is formed between sidewalls 34 and 36, the partition 22 of the lower compartment and the top wall 38 of the cleaner housing 12. Within the top wall 38, an exit slot 40 is provided to register vertically with the entrance slot 28 at the bottom of the frame so that the sheet filter material may enter the housing through the slot 28 and exit the housing through the slot 40. Preferably, the slot 40 has a serrated knife edge 42 to facilitate tearing off of the used filter media when it is replaced by drawing the filter media upwardly through the hollow frame from the supply roll R.

As shown in FIG. 2, the entrance and exit slots cause a filter sheet 44 to extend across the front of the hollow frame 32. Along the sides of the hollow frame, tracks are provided at 46 to slidably receive the marginal edges of the filter sheet and guide the filter sheet 44 to a position extending across the front of the hollow frame, also providing a loose seal for assuring that the airflow through the housing is directed inwardly through the filter sheet 44. Between the tracks 46, a grille 48 is positioned to back up the filter sheet 44 and prevent it from being drawn into the hollow frame 32 when the fan, shown at 52 within the frame 32 is operating. Spaced rearwardly from the front grille 48 is a rear grille 49 to protect the rear side of the fan 52. As shown in FIG. 2, the rear grille 49 is inset into the frame 32 to provide a recessed area which may accommodate a storage hook 51 for the electrical cord 53 which supplies the fan with energy. The cord 53 has a plug for being plugged into a standard receptacle.

The top of the hollow frame 32 houses the electrical connections for the motor. The connections include a control box 54 having a three-speed switch 55, an indicator light 56 and a fuse assembly 57 which may include a fuse 58 and a glow lamp 59. As shown in FIG. 5, the control box 54 operates to energize a fan motor 61, which, in turn, drives the fan 52. In the present instance, the fan 52 is an axial fan having four blades extending radially from a hub 62. In the present instance, the hub 62 is mounted directly on the shaft of the motor 61. The motor/fan assembly is mounted centrally in the hollow frame portion 32 by a pair of upright channel supports 65 which extend from the partition 22 to the top wall 38 providing, in addition, reinforcement to the frame 32 intermediate the sidewalls 34 and 36. The electrical connections from the control box 54 to the fan motor 61 are contained in the channel elements 65.

As noted above, operation of the motor causes the ambient air in the workshop or other occupied space to circulate through the sheet 44 at a flow rate of approximately 2500 to 3000 cubic feet per minute. The air cleaner is designed to use filter media as described in my earlier U.S. Pat. Nos. 4,239,516 and 4,293,378 which is a paper-like non-woven web of glass fibers intermixed with microbits of expanded thermoplastic styrene-polymer or expanded thermoplastic lower polyolefin or flexible foam polyurethane and suitable organic bonding agent. The filter may contain other additives or other constituents which function as molecular sieve particles or gas-absorption mechanisms for pollutants. The filter medium may be fabricated in various ways to provide the porosity and the filtration characteristics which are desired for a particular end use. For example, a filter medium made in paper-making apparatus in accordance with Example 1 of the aforesaid Klein U.S. Pat. No. 4,239,516, comprising polystyrene micro-bits, glass fibers and polyvinyl alcohol, has a porosity value of 602.8 liters per minute per square decimeter of surface at a pressure differential of 2.54 cm. of water (gauge). Another suitable filter medium is the mat described in Example 2 of Klein U.S. Pat. No. 4,293,378 which is also made using paper-making apparatus. The mat comprises glass fibers, the aforesaid polymer micro-bits, and an intimate blend or cobeat of polymer micro-bits, cellulose fibers and polyester fibers, together with polyvinyl alcohol as a binding agent and melamine-formaldehyde as a wet-strength enhancing agent. The porosity of the finished mat is generally from about 300 to about 1500 liters per minute per square decimeter at a pressure differential of 2.54 cm. of water (gauge). The filter medium possesses excellent wet strength, which is on the order of 2 kg./cm.

Still another suitable filter medium is a non-woven material comprising cellulose and rayon fibers held together by a suitable organic binder and having activated carbon particles dispersed throughout for improved adsorption capacity. This medium is also conveniently prepared using standard paper-making apparatus and may, if desired, contain polyester fibers and the aforesaid micro-bits, the latter serving, inter alia, to prevent dusting of the carbon particles from the mat. A mat of this type having porosity from about 150 to about 450 liters per minute per square decimeter at a pressure differential of 2.54 cm. of water (gauge) is very effective.

The pollutants lodge in the filter medium as the dirty air is drawn through the frame 32 by the fan 52. Periodically, the filter media is removed and replaced, so that the pollutants lodged in the filter medium may be disposed of. If the pollutants include valuable components, they may be separated from the filter medium for recycling, but normally the pollutants are disposed of by discarding the pollutant-laden filter sheets.

The filter media are effective to entrap pollutants from the air circulating therethrough, and if not replaced in due course, the filter media may become clogged with pollutants. When this occurs, the air passage through the hollow frame is impeded by the blinded filter media and the impedence of the airflow through the fan places an undesirable load upon the fan motor causing overheating. In order to avoid this, the control circuit provides an overload control in the form of the fuse 58. As the motor becomes overloaded, it draws a higher amperage, and the higher amperage will cause the fuse to blow. Blowing the fuse interrupts the circuit through the control box and stops the fan motor and deenergizes the indicator light 56. The indicator light is connected in parallel with the motor so that when the motor is operating, the indicator light is illuminated. When the motor is not operating, the indicator light is off. If the fan is not rotating, and the motor is still energized, the indicator 56 will remain lighted so as to let the operator know that there is a problem. If the switch 55 is on and the indicator 56 is not lighted, the operator knows that there is no power going to the motor which may probably be the result of the fuse 58 being blown. A blown fuse indicates that the filter medium must be replaced with a fresh unblocked filter media sheet, and the fuse replaced.

It may be desired to provide an additional indication that the fuse is blown by the use of a glow lamp 59 associated with the fuse, as is common. Other circuit breaker devices may be used which are responsive to motor overload, but for reason of economy, a simple fuse is preferred as overload protection.

Replacement of the filter medium is a quick and simple operation. The spent filter medium in the front of the housing is simply advanced upwardly through the exit slot 40 until a fresh section of the filter sheet covers the open front of the hollow frame 32. The spent filter media is then torn off at the exit slot, using the serrated knife 42 and is discarded. The fuse 58 is replaced and the air cleaner may be put back into operation. After some experience with the apparatus in a particular workshop, the operator, by visual observation of the medium, can predict the need to advance the filter medium, thereby avoiding the motor overload and the blowing of the fuse.

The present application, when used in a closed room with the filter medium of Example 1 of U.S. Pat. No. 4,239,516, has been found effective to provide relief to persons suffering from allergies. The recirculation of room air through the filter media for a prolonged time period generates a sufficient flow to subject substantially the entire volume of the closed room to the filtration, and thereby reduces the particulates in the air to provide the desired relief.

The foregoing embodiment of the invention provides a device which is highly economical, and yet which is fully effective to cleanse the air in a work space or other occupied area. Its operation is simple and maintenance is minimal, only requiring periodic advance of the filter media, and replacement of the roll R when it is depleted.

While a particular embodiment of the present invention has been herein illustrated and described, it is not intended to limit the invention such disclosure but changes and modifications may be made therein and thereto within the scope of the following claims.

I claim:

1. A method of cleaning air from pollutants in a workshop having a free space comprising the steps of providing a free-standing hollow frame having an open front, an open back, and an axial fan therein, placing a sheet of filter medium across the open front of said casing so that operation of the fan draws air from the free space into the casing through said sheet of filter medium and discharges the air to said free space, placing said frame in the vicinity of a pollution-generating location within the workshop so that the open front and open back of the frame communicate with said free space, energizing said fan to create a substantial flow of air through said open front and open back of said frame and said sheet of filter medium, said flow causing pollutants entrained in the air to lodge in said filter medium, periodically removing at least a portion of said sheet of filter medium from said frame and replacing it with a fresh sheet of filter medium, and disposing of the pollutants lodged in said removed sheet of filter medium.

2. A method according to claim 1 wherein said step of disposing of the pollutants is effected by disposing of said sheet with the pollutants lodged therein.

3. A method according to claim 1 wherein said filter medium is a non-woven web of fibrous material having polymeric microbits throughout.

4. A method of providing relief to a person suffering from allergies comprising the steps of providing a free-standing hollow frame having an open front, an open back, and an axial fan therein, positioning said frame in a free space within a closed room in which said person is situated, placing a sheet of filter medium comprising a non-woven web of fibrous material having polymeric microbits throughout across the front surface of said casing so that operation of the fan draws air from said free space through the open front and open back of the casing and through said sheet of filter medium, energizing said fan to create a substantial flow of air through said frame and said sheet of filter medium, said flow causing pollutants entrained in the air to lodge in said filter medium, continuing the circulation of air through said filter media for a period sufficient to subject substantially the entire volume of the closed room to filtration, periodically removing at least a portion of said sheet of filter medium from said frame and replacing it with a fresh sheet of filter medium, and disposing of the pollutants lodged in said removed sheet of filter medium.

5. A portable air cleaner comprising an upright housing having a transverse partition dividing it into a lower compartment for housing a supply of filter medium in sheet form disposed substantially horizontal and a hollow frame overlying said compartment, said hollow frame being open at the front and back, guideway means for the filter medium disposed across the front of said frame and extending into said lower compartment, said partition terminating at its front edge short of said guideway means to provide a slotted passage between said compartment and said hollow frame to accommodate a sheet of filter medium in said guideway means, said frame having an upper wall with a slot in the front part thereof communicating with said guideway through which the free end of said filter medium may pass, means on the bottom of said upright housing operable to support said housing for free movement along a surface, a first grille inwardly adjacent the front of said hollow frame coextensive with and parallel to said guideway providing a foraminous covering to support the filter medium against inward displacement into said hollow frame, upright support members behind said grille extending between said partition and said upper wall centrally relative to said guideway means, an axial fan mounted on said upright support means in said hollow frame having a central hub rotatably supporting radial blades for rotation about a central axis through said hub, said blades having a pitch operable to cause airflow through the open front of said hollow frame, through said filter medium into said frame through said grille, and then through the open back of said frame upon rotation of said hub, a motor driving said hub, and means to supply power to said motor to effect rotation of said fan.

6. A portable air cleaner according to claim 5 including a second grille disposed parallel to said first grille at the rear of said fan hub to provide a foraminous enclosure for said fan blades.

7. A portable air cleaner according to claim 5 wherein said guide means comprises a pair of upright tracks along the side edges at the front of the frame, said tracks providing guideways to slidably receive the marginal edges of the sheet of filter medium.

8. A portable air cleaner according to claim 5 wherein said fan includes an electric motor having a drive shaft mounted on said support members centrally between said partition and said upper wall, said fan hub being mounted directly on said drive shaft.

9. An air cleaner according to claim 5 including a roll of filter medium positioned in said lower compartment to constitute said supply, said filter medium comprising a non-woven web of fibrous material having polymeric microbits throughout.

10. A portable air cleaner comprising an upright housing having a lower compartment for housing a supply of filter medium in sheet form disposed substantially horizontal, said lower compartment being defined by a bottom wall of said housing, a partition disposed parallel above said bottom wall a distance to accommodate the supply of filter medium, a rear wall extending between said bottom wall and said partition, and a door hinged to the front of said bottom wall and adapted to extend above said partition when upright, the front edge of said partition being spaced rearwardly from said door when it is upright to provide an entrance slot, a hollow frame overlying said compartment, said hollow frame being open at the front and the back, guideway means for the filter medium disposed across the front of said frame and extending into said lower compartment through said entrance slot, said frame having an exit slot in its upper wall communicating with said guideway through which the free end of said filter medium may pass, means on the underside of said bottom wall of said upright housing operable to support said housing for free movement along a surface, a grill in said hollow frame coextensive with and parallel to said guideway providing a foraminous covering to support the filter medium against inward displacement into said hollow frame, an axial fan mounted in said hollow frame having a central hub rotatably supporting radial blades for rotation about a central axis through said hub, said blades having a pitch operable to cause airflow through the open front of said hollow frame, through said filter medium into said frame through said foraminous covering, and then through the open back of said frame upon rotation of said hub.

11. An air cleaner according to claim 12 wherein said door material is ferro-magnetic, including latch means for releasably retaining said door in its upright position, said latch means comprising magnetic latches positioned adjacent said partition to engage the upper margin of said door when it is upright.

12. An air cleaner according to claim 10 wherein said supply of filter medium comprises a roll, and said door comprises a sheet of rigid material operable when pivoted to its lowered position to serve as a ramp for guiding the roll of filter medium into the compartment.

13. An air cleaner according to claim 12 wherein said roll of filter medium comprises elongated non-woven web of fibrous material having polymeric microbits throughout.

14. A portable air cleaner comprising an upright housing having a lower compartment for housing a supply of filter medium in sheet form disposed substantially horizontal, a hollow frame overlying said compartment, said hollow frame being open at the front and the back, guideway means for the filter medium disposed across the front of said frame and extending into said lower compartment, said frame having a slot in its upper wall communicating with said guideway through which the free end of said filter medium may pass, means on the bottom of said upright housing operable to support said housing for free movement along a surface, a grille in said hollow frame coextensive with and parallel to said guideway providing a foraminous covering to support the filter medium against inward displacement into said hollow frame, an axial fan mounted in said hollow frame having a central hub rotatably supporting radial blades for rotation about a central axis through said hub, said blades having a pitch operable to cause airflow inwardly through the open front of said hollow frame, through said filter medium into said frame through said foraminous covering, and then through the open back of said frame upon rotation of said hub, a motor driving said hub, and circuit means to supply power to said motor to effect rotation of said fan, said circuit means including a switch to control the energization of said motor, an indicator means, and overload means actuated upon blockage of the filter media to interrupt energization of said motor, said indicator means being connected to said overload means so that actuation of said overload means is signaled by said indicator means.

15. An air cleaner according to claim 14 wherein said indicator is a lamp electrically connected in parallel with said motor.

16. An air cleaner according to claim 14 wherein said circuit means includes an electric cord adapted to be plugged into a standard receptacle, and said support means on the bottom of the housing comprises casters positioned at four corners of the bottom.

17. An air cleaner according to claim 14 wherein said overload means comprises a fuse in the electrical supply line to said motor.

18. An air cleaner according to claim 17 including a glow lamp connected across said fuse.

* * * * *